United States Patent [19]
Armstrong

[11] Patent Number: 5,658,035
[45] Date of Patent: Aug. 19, 1997

[54] QUICK DETACHABLE MOTORCYCLE WINDSHIELD

[75] Inventor: Jeffrey L. Armstrong, Fredonia, Wis.

[73] Assignee: Harley-Davidson Motor Company, Milwaukee, Wis.

[21] Appl. No.: 365,283

[22] Filed: Dec. 28, 1994

[51] Int. Cl.⁶ .................................................. B62J 17/04
[52] U.S. Cl. .............................................................. 296/78.1
[58] Field of Search .................................. 296/77.1, 78.1, 296/84.1, 90, 96.21, 96.22

[56] References Cited

U.S. PATENT DOCUMENTS

| | | | |
|---|---|---|---|
| 2,903,297 | 9/1959 | Zbikowski | 296/78.1 |
| 4,082,345 | 4/1978 | Willey | 296/78.1 |
| 4,226,463 | 10/1980 | Gager, Jr. | 296/78.1 |
| 4,615,556 | 10/1986 | Stahel | 296/78.1 |

FOREIGN PATENT DOCUMENTS

| | | |
|---|---|---|
| 60807 | 9/1982 | European Pat. Off. |
| 827330 | 2/1960 | United Kingdom . |

OTHER PUBLICATIONS 1993 and 1994 Parts Catalog, pp. 160, 164, 170, and 172, Harley-Davidson Motor Company.

94 Custom Chrome Catalog, pp. 710–713, Harley-Davidson Motor Company.

*Primary Examiner*—Andrew C. Pike
*Attorney, Agent, or Firm*—Michael, Best & Friedrich

[57] ABSTRACT

A detachable motorcycle windshield assembly includes a windshield, and a pair of mounting brackets attached respectively to each side of the windshield and each including an upper portion and a lower portion extending downwardly from the upper portion. A first socket is formed on the lower portion of each bracket for pivotally engaging a first bushing fixed to the motorcycle and a second socket is formed on the upper portion of each bracket for engaging a second bushing fixed to the motorcycle generally above the first bushing. A latch releasably secures each second socket to one of the second bushings.

13 Claims, 2 Drawing Sheets

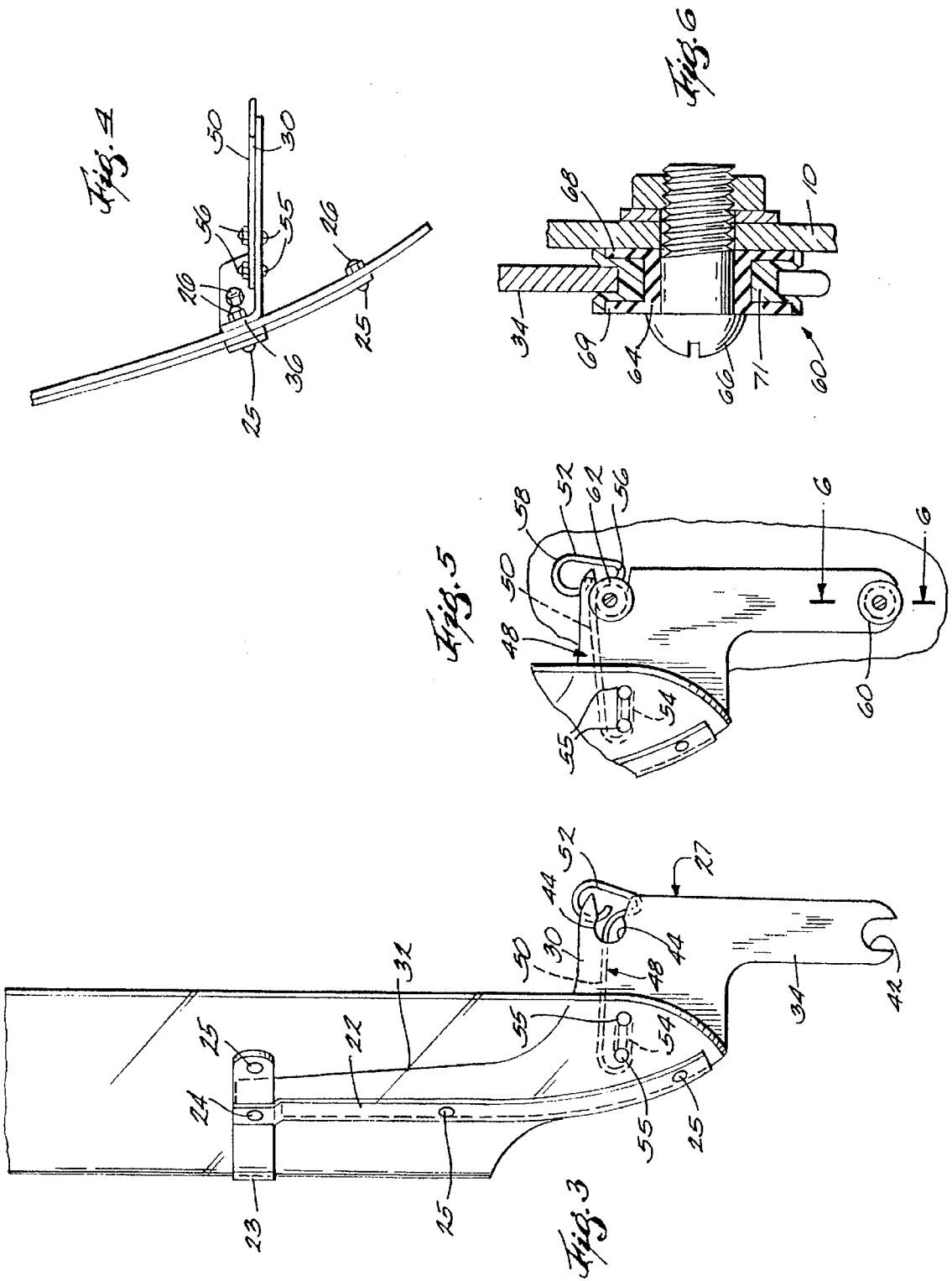

QUICK DETACHABLE MOTORCYCLE WINDSHIELD

BACKGROUND OF THE INVENTION

This invention relates to motorcycles and more particularly to a quick detachable motorcycle windshield.

The use of motorcycle windshields is desirable for long distance highway travel to minimize fatigue caused by windloading on the rider's exposed upper body. On the other hand, many motorcycle riders prefer not to employ a windshield for short trips or lower speed street travel. However, because the installation and removal of prior art windshields was normally time-consuming and required the use of tools, rapid conversion was normally not a viable option. For example, motorcycle windshields were typically bolted to the vehicle and in some models, several other components had to be removed to permit removal or installation of the windshield. Moreover, in some cases, removal of the windshield exposed unsightly hardware or brackets which remained on the vehicle. Some vehicles also required the installation of spacers to fill the space previously occupied by the windshield.

SUMMARY OF THE INVENTION

It is a primary object of the invention to provide a motorcycle windshield which can be readily attached and detached from the vehicle.

Another object of the invention is to provide a motorcycle windshield which can be attached to and detached from the vehicle without the use of tools.

A further object of the invention is to provide a motorcycle windshield which can be detached from the vehicle without exposing unsightly parts.

These and other objects and advantages of the invention will become more apparent from the detailed description thereof taken with the accompanying drawings.

In general terms, the invention comprises a combination for use with a motorcycle and comprising a windshield and a mounting bracket attached to each side of the windshield. The mounting brackets each includes an upper portion and a lower portion extending downwardly from the upper portion. A first socket means is formed on the lower portion of each mounting bracket for pivotally engaging a first member fixed to the motorcycle and a second socket means is formed on the upper bracket portion for engaging a second member fixed to the motorcycle above the first member and latching means for releasably securing the second socket means to the second member.

BRIEF DESCRIPTION OF THE DRAWINGS

FIG. 3 is a side view of the motorcycle windshield according to the invention;

FIG. 4 is a top view of the motorcycle windshield shown in FIG. 3;

FIG. 5 is a fragmentary view of a portion of the motorcycle shown in FIG. 1; and FIG. 6 is a sectional view taken along lines 6—6 of FIG. 5.

DETAILED DESCRIPTION OF THE PREFERRED EMBODIMENT

Figure 1:
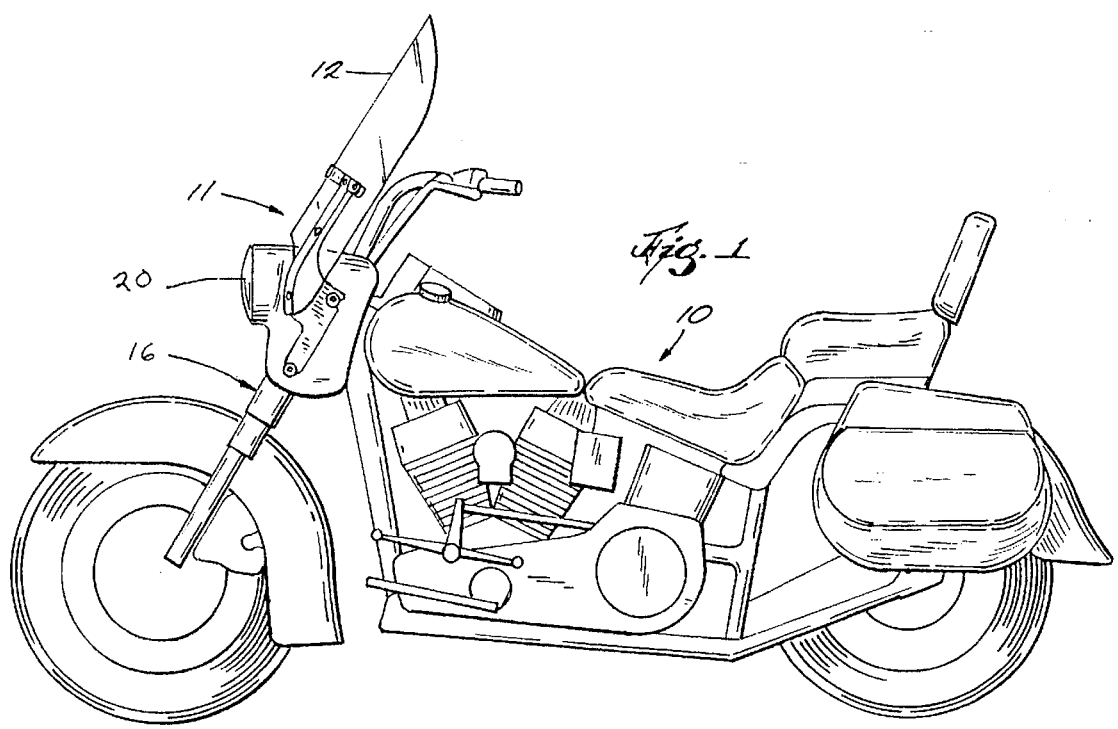
FIG. 1 is a side elevational view of a motorcycle having a quick detachable windshield according to the invention.
Figure 2:
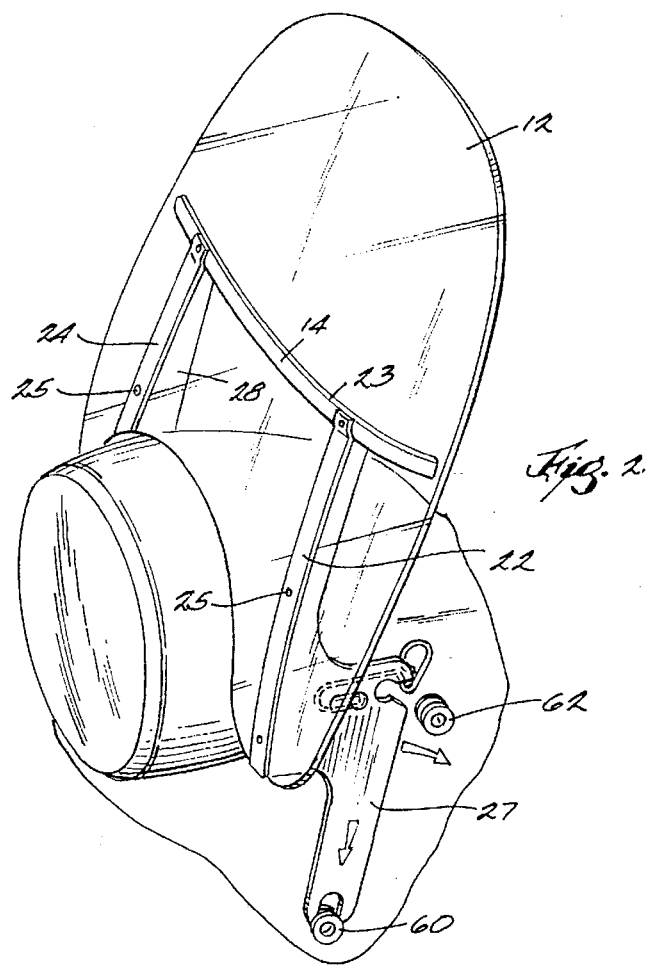
FIG. 2 is a perspective view of a portion of the motorcycle shown in FIG. 1.

FIG. 1 shows a conventional motorcycle 10 having a quick detachable windshield assembly 11 according to the preferred embodiment of the invention. The windshield assembly as shown more particularly in FIGS. 2, 3, and 4 to include a windshield 12 formed of any suitable transparent, shatter-resistant material. A generally rectangular cutout 14 is formed in the lower edge of the windshield 12 so that it fits over the front fork 16 and the headlight 20 of the motorcycle 10. The cutout 14 is framed by braces 22, 23, and 24 which are suitably secured to the windshield 12 by screws 25 and nuts 26.

The windshield assembly 11 also includes brackets 27 and 28, fixed at the opposite sides of the windshield 12 to the braces 22, 23, and 24, with bracket 27 being a mirror image of bracket 28. In particular, each bracket 27 and 28 includes an upper portion 30, an arm 32 extending upwardly from the forward edge of portion 30 and a lower portion 34 extending downwardly from the rear edge of portion 30. A thin flange 36 is formed along the forward edge of the arm 32 and the upper portion 30 and extends at an angle relative thereto. The flanges 36 of each brackets 27 and 28 are attached to the rear surface of the windshield and in an opposed relation to the braces 22 and 24, respectively, by means of the screws 25 and nuts 26 which also secure the braces 22 and 24.

A generally U-shaped first socket 42 is formed at the lower end of lower portion 34 and faces downwardly. A generally U-shaped second socket 44 is formed at the upper rear of upper portion 30 and opens rearwardly. A latch 48 is mounted adjacent to each of the sockets 44 on brackets 27 and 28 and each latch 48 consists of a heavy gauge wire spring bent to define a stem 50 and a head 52. A first oval loop 54 is formed at the base of the stem 50 for receiving a pair of screws 55 each of which also passes through one of a pair of spaced-apart openings in the brackets 27 and 28. Each screw 55 is threadably received in a nut 56 to secure the latches 48 in position. The head 52 of each latch 48 is formed with a downwardly extending, U-shaped loop 56 and upwardly extending loop 58. When the spring latches 48 are unflexed, the legs 56 extend downwardly across the open end of the sockets 44.

A pair of bushings 60 and 62 are mounted at each side of the motorcycle 10 and are spaced apart the same distance as that between the sockets 42 and 44. Each bushing 60 and 62 is shown in FIG. 6 to comprise an elastomer member 64 having a central opening for receiving a screw 66 which secures the bushing to the motorcycle 10 and a pair of radially extending flanges 68 and 69. In addition, an annular metallic insert 71 is disposed between the flanges 68 and 69 for being engaged by the socket 42 or In order to mount the windshield assembly 11 on the motorcycle 10, the assembly is positioned with the sockets 42 on the lower ends of the each of the brackets 27 or 28 located above the lower bushings 60. The width of each socket 42 is sufficient to embrace the metallic inserts 71. The assembly is lowered until the upper margin of the sockets 42 engage one of the bushings 71. The assembly is then rotated clockwise as viewed in FIG. 2 and the latches 48 are flexed upwardly to move the legs 56 away from the open ends of the sockets 44. Continued rotation of the assembly moves the sockets 44 into engagement with the upper bushings 62. When the sockets 44 are fully seated, the latches 48 are released to lock the windshield assembly 11 in position. The elastomer bushings 64 are compressed slightly when the brackets 27 and 28 are mounted on the vehicle to help retain the brackets 27 and 28 in position.

When it is desired to remove the windshield assembly 11 from the motorcycle 10, the latch springs 48 at the opposite sides of the vehicle are flexed upwardly thereby moving the legs 56 away from the open end of the sockets 44. This permits the assembly 11 to be pivoted counterclockwise as viewed in FIG. 2 and then elevated to move the sockets 42 away from the lower bushing 60. It can thus be seen that the windshield assembly 11 can be mounted on and removed from the motorcycle 10 quickly and without the requirement for tools.

While only a single embodiment of the invention has been illustrated and described, it is not intended to be limited thereby but only by the scope of the appended claims.

What is claimed is:

1. A detachable motorcycle windshield assembly comprising a windshield having opposite sides, first and second mounting means attached respectively to each side of the windshield and each including an upper portion and a lower portion, a first socket means formed in the lower portion of each mounting means for pivotally engaging a first lower mounting member mounted on one side of a motorcycle and a second socket means formed on said upper portion of each mounting means for engaging a second mounting member on the motorcycle generally above the first mounting member, and a releasable latch means mounted adjacent each second socket means for maintaining said second socket means on the second mounting member, wherein each of said first socket means opens substantially downwardly and each of said second socket means opens substantially rearwardly relative to an orientation of the assembly on the motorcycle.

2. The windshield assembly set forth in claim 1 wherein said first and second mounting means comprise brackets attached respectively to the opposite sides of the windshield, the lower portion of each of said brackets extending downwardly from the upper portion and each having said first socket means formed thereon adjacent a lower end thereof, each of said first socket means comprises an open-ended socket facing generally downwardly, each of said second socket means comprises a second open-ended socket facing generally rearwardly, and each said latch means comprises a spring member fixed to each bracket and having a portion extending downwardly across an open end of the second socket means when said spring member is in an unflexed condition.

3. The combination of a motorcycle, including a pair of spaced-apart mounting members extending laterally from each side of said motorcycle, wherein a first one of each pair of mounting members is disposed generally below a second one of each pair of mounting members, and a detachable windshield assembly including a windshield having opposite sides, a pair of mounting means attached respectively to each side of the windshield and each including an upper portion and a lower portion extending downwardly from the upper portion, a first socket means formed in the lower portion of each mounting means for pivotally engaging the first one of the mounting members on the motorcycle and a second socket means formed on the upper portion for engaging the second one of the mounting members, and latch means for releasably securing each of the second socket means to one of the second mounting members, wherein each of said first socket means opens substantially downwardly and each of said second socket means opens substantially rearwardly relative to an orientation of the windshield assembly on the motorcycle.

4. The combination set forth in claim 3 wherein each of said mounting members includes an elastomeric portion coupled to the motorcycle and a metallic portion engaged by one of the first and second socket means.

5. The combination set forth in claim 3 wherein the first socket means on each mounting means is spaced apart from the second socket means thereon a distance equal to that of said mounting members.

6. The combination set forth in claim 3 wherein said first and second mounting means comprise brackets attached respectively to the opposite sides of the windshield, the lower portion of each of said brackets extending downwardly from the upper portion thereof, each of said first socket means comprises a first open-ended socket formed adjacent a lower end of each lower portion and facing generally downwardly, each of said second socket means comprises a second open-ended socket formed in said corresponding upper portions and facing rearwardly, and each said latch means comprises a spring member fixed to one of said brackets and each having a portion extending downwardly across an open end of one of the second sockets when said spring members are in an unflexed condition.

7. The combination set forth in claim 6 wherein each of said mounting members includes an elastomeric portion coupled to said motorcycle and a metallic portion engagable by one of the first and second socket means.

8. A combination of a motorcycle, a motorcycle windshield, and a mounting mechanism, said mounting mechanism comprising:
a first mount interconnecting a first portion of said windshield with a first portion of said motorcycle, said first mount including:
a first mounting member secured to one of said windshield and said motorcycle; and
a first socket formed in another of said windshield and said motorcycle, wherein said first mounting member slidably engages said first socket, and wherein said first mounting member and said first socket are arranged such they limit movement of said windshield with respect to said motorcycle without aid of a separate locking mechanism; and
a second mount spaced from said first mount and interconnecting a second portion of said windshield with a second portion of said motorcycle, said second mount including:
a second mounting member secured to one of said windshield and said motorcycle;
a second socket formed in another of said windshield and said motorcycle, wherein said second mounting member slidably engages said second socket; and
a releasable latch positioned to maintain engagement of said second mounting member with said second socket, wherein said latch is movable between latched and unlatched positions, wherein said latch is biased toward the latched position, and wherein said releasable latch comprises a wire spring member.

9. The combination of claim 8, wherein said first socket includes a first slot having an open end facing in a first direction, and said second socket includes a second slot having an open end facing in a second direction, and wherein the first and second directions are at an angle relative to each other.

10. The combination of claim 9, wherein the first and second directions are substantially perpendicular to each other.

11. A combination of a motorcycle, a motorcycle windshield, and a mounting mechanism, said mounting mechanism comprising:
a first mount interconnecting a first portion of said windshield with a first portion of said motorcycle, said first mount including:
a first mounting member secured to one of said windshield and said motorcycle; and
a first socket formed in another of said windshield and said motorcycle, wherein said first mounting member slidably engages said first socket, and wherein said first mounting member and said first socket are arranged such they limit movement of said windshield with respect to said motorcycle; and a second mount spaced from said first mount and interconnecting a second portion of said windshield with a second portion of said motorcycle, said second mount including:
- a second mounting member secured to one of said windshield and said motorcycle;
- a second socket formed in another of said windshield and said motorcycle, wherein said second mounting member slidably engages said second socket; and
- a releasable latch positioned to maintain engagement of said second mounting member with said second socket, wherein said latch is movable between latched and unlatched positions, wherein said latch is biased toward the latched position and wherein said releasable latch comprises a wire spring member.

12. The combination of claim 11, wherein said first socket includes a first slot having an open end facing in a first direction, and said second socket includes a second slot having an open end facing in a second direction, and wherein the first and second directions are at an angle relative to each other.

13. The combination of claim 12, wherein the first and second directions are substantially perpendicular to each other.

* * * * *